United States Patent
Pawlowski

[11] Patent Number: 5,825,788
[45] Date of Patent: Oct. 20, 1998

[54] DATA ORDERING FOR CACHE DATA TRANSFER

[75] Inventor: Joseph Thomas Pawlowski, Boise, Id.

[73] Assignee: Micron Technology Inc., Biose, Id.

[21] Appl. No.: 650,470

[22] Filed: May 20, 1996

[51] Int. Cl.$^6$ ............................................. G11C 29/00
[52] U.S. Cl. ..................... 371/40.11; 395/307; 395/312; 395/854; 395/855
[58] Field of Search ................ 371/40.1; 395/183.18, 395/469, 471, 497.3, 854, 855, 307, 312

[56] References Cited

U.S. PATENT DOCUMENTS

| | | | |
|---|---|---|---|
| 5,015,883 | 5/1991 | Waller | 307/465 |
| 5,091,846 | 2/1992 | Sachs et al. | 395/250 |
| 5,164,944 | 11/1992 | Benton et al. | 371/40.1 |
| 5,220,215 | 6/1993 | Douglas | 307/465 |
| 5,235,221 | 8/1993 | Douglas | 307/465 |
| 5,287,017 | 2/1994 | Narasimhan | 307/465 |
| 5,298,803 | 3/1994 | Starkweather | 307/465 |
| 5,300,830 | 4/1994 | Hawes | 307/465 |
| 5,469,555 | 11/1995 | Ghosh et al. | 395/460 |
| 5,559,986 | 9/1996 | Alpert et al. | 395/471 |
| 5,586,303 | 12/1996 | Willenz et al. | 395/497.03 |
| 5,590,352 | 12/1996 | Zuraski, Jr. et al. | 395/800 |
| 5,627,963 | 5/1997 | Gabillard et al. | 395/183.18 |

*Primary Examiner*—Paul P. Gordon
*Assistant Examiner*—McDieunel Marc
*Attorney, Agent, or Firm*—Schwegman, Lundberg, Woessner & Kluth, P.A.

[57] ABSTRACT

A system and method for ordering the transfer of data words within a cache line transfer. The cache memory receives an address from a processor and selects the cache line corresponding to the address. The cache memory then determines an order for transferring cache line data words from the selected cache line based on the likelihood that each data word in the order will be needed by the processor. The data words are then transferred to the processor in the desired order.

10 Claims, 5 Drawing Sheets

| TAG | WORD A.1 | WORD A.2 | WORD A.3 | WORD A.4 | ~25.1 |
|---|---|---|---|---|---|
| | WORD B.1 | WORD B.2 | WORD B.3 | WORD B.4 | ~25.2 |
| | WORD C.1 | WORD C.2 | WORD C.3 | WORD C.4 | ~25.3 |
| | WORD D.1 | WORD D.2 | WORD D.3 | WORD D.4 | ~25.4 |

FIG. 2

| TAG | WORD A.1 | WORD A.2 | WORD A.3 | WORD A.4 | ~28.1 |
|---|---|---|---|---|---|
| TAG/ECC | WORD B.1 | WORD B.2 | WORD B.3 | WORD B.4 | ~28.2 |
| TAG/ECC | WORD C.1 | WORD C.2 | WORD C.3 | WORD C.4 | ~28.3 |
| TAG/ECC | WORD D.1 | WORD D.2 | WORD D.3 | WORD D.4 | ~28.4 |

FIG. 3A

| TAG/ECC | WORD A.1 | WORD A.2 | WORD A.3 | WORD A.4 | ~29.1 |
|---|---|---|---|---|---|
| WORD D.1 | WORD B.1 | WORD B.2 | WORD B.3 | WORD B.4 | ~29.2 |
| WORD D.3 | WORD C.1 | WORD C.2 | WORD C.3 | WORD C.4 | ~29.3 |
| | | WORD D.2 | | | |
| | | WORD D.4 | | | |

FIG. 3B

DATA ORDERING FOR CACHE DATA TRANSFER

BACKGROUND OF THE INVENTION

1. Field of the Invention

The present invention relates to cache memory architectures and in particular to a data ordering which can be used in transfers from cache memory to increase the likelihood that the first words transferred will be useful.

2. Background Information

The speed with which a processor can access data is critical to its performance. At the same time, providing uniformly fast memory access can be cost prohibitive. To get around this problem, computer architectures have relied on a mix of fast, less dense, memory and slower bulk memory. In fact, many computer architectures have a multilevel memory architecture in which an attempt is made to find information in the fastest memory. If the information is not in that memory, a check is made at the next fastest memory. This process continues down through the memory hierarchy until the information sought is found. One critical component in such a memory hierarchy is a cache memory.

Cache memories rely on the principle of locality to attempt to increase the likelihood that a processor will find the information it is looking for in the cache memory. To do this, cache memories typically store contiguous blocks of data. In addition, the cache memory stores a tag which is compared to an address to determine whether the information the processor is seeking is present in the cache memory. Finally, the cache memory may contain status or error correcting codes (ECC). Cache memories are usually constructed from higher speed memory devices such as static random access memory (SRAM).

The typical cache memory transfers a cache line as a contiguous block of data, starting at the first word in the cache line and proceeding through to the last. This method of transferring cache lines does not take into account the fact that the processor may have no need for the first word in the cache line and that, therefore, it must wait a number of cycles until the word it is looking for is transferred.

What is needed is a method of ordering data transferred from a cache memory to a processor which increases the likelihood that useful data is transferred in the first transfer cycle.

SUMMARY OF THE INVENTION

The present invention is a system and method for ordering the transfer of data words within a cache line transfer. The cache memory receives an address from a processor and selects the cache line corresponding to the address. The cache memory then determines an order for transferring cache line data words from the selected cache line based on the likelihood that each data word in the order will be needed by the processor. The data words are then transferred to the processor in the desired order.

BRIEF DESCRIPTION OF THE DRAWINGS

FIG. 2 is an illustration of a cache line transfer according to the present invention;

FIGS. 3a and 3b are illustrations of alternative methods of transferring a cache line;

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Figure 1:
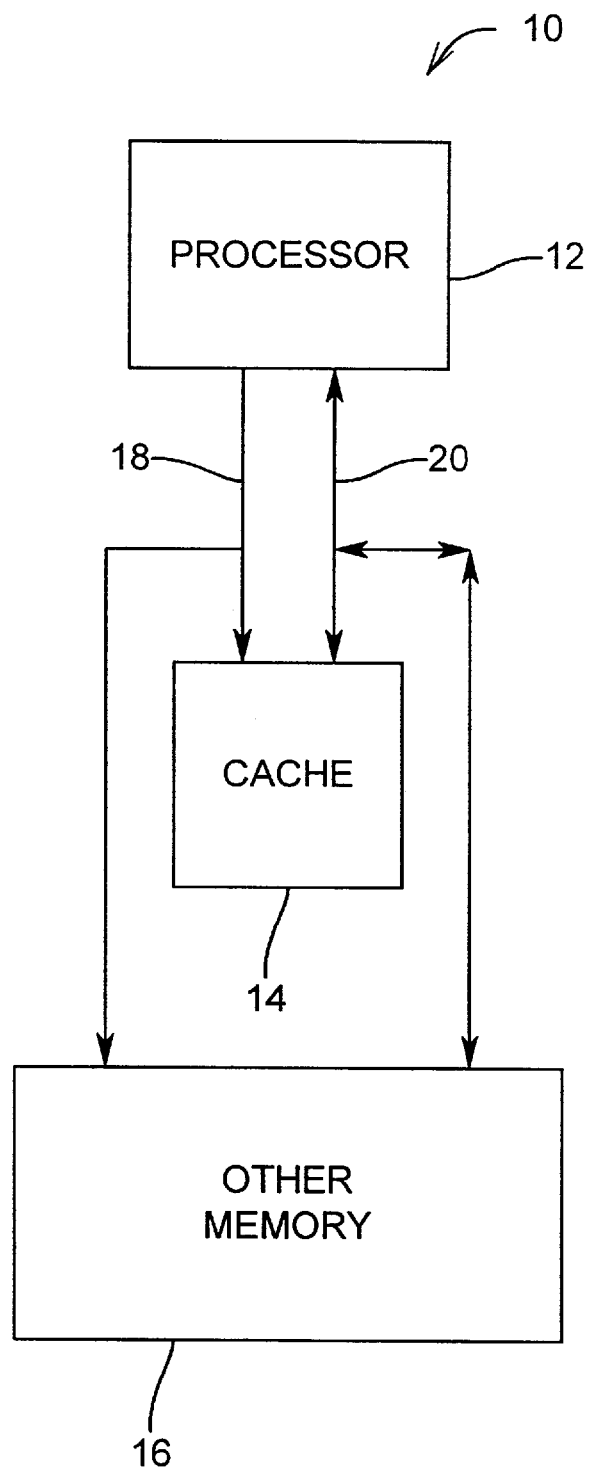
FIG. 1 illustrates a multiple memory level computer system in which a processor communicates with a cache memory and other memory over an address bus and a data bus.

FIG. 1 illustrates a multiple memory level computer system 10 in which a processor 12 communicates with a cache memory 14 and a memory 16 over an address bus 18 and a data bus 20. Cache lines read from cache memory 14 are transferred over data bus 20 to processor 12. In one embodiment, processor 12 is a 64-bit microprocessor which transfers data as longwords (i.e., four 16-bit words).

As noted above, the typical cache memory 14 transfers a cache line as a contiguous block of data, starting at the first entry in the cache line and proceeding through to the last. This method of transferring cache lines does not take into account the fact that the processor may have no need for the first word in the cache line and that, therefore, it must wait a number of cycles until the word it is looking for is transferred. A better approach to transferring the cache line takes into account the word the processor was seeking in the cache, transferring that word first and then following that word with words from the cache line in the order that the processor is most likely to require the words. This approach can be best understood by referencing FIG. 2.

In the example shown in FIG. 2 words A, B C and D, in that order, represent the order of data criticality to the processor. The actual physical address which is considered critically ordered differs from processor to processor in existing implementations and may entail a modula-4 linear burst, a modula-4 interleaved order, etc. The optimal order for this type of device is modula-4 linear burst. Any other ordering will prevent maximization of performance for a processor designed to utilize the 96-bit operation. Hence, A, B, C, and D would show the following sequence represented in binary form in which X stands for "any":

TABLE 1

| Data Ordering in a Four Entry Cache Line | | | | |
|---|---|---|---|---|
| Initial address | A | B | C | D |
| x00 | x00 | x01 | x10 | x11 |
| x01 | x01 | x10 | x11 | x00 |
| x10 | x10 | x11 | x00 | x01 |
| x11 | x11 | x00 | x01 | x11 |

Note that the entries in the four entry cache line may be words, longwords, etc.

As can be seen in FIG. 2, in a cache memory system having a data bus wide enough to transfer not only the data word but also the tag word, transfer of a four entry cache line can be accomplished in four cache transfer cycles 25.1–4. In the example shown, tag word 26 is transferred in the first of cache transfer cycles 25. This tends to be the most efficient way of transferring tag word 26. In another embodiment, portions of tag word 26 may be sent in two or more cycles 25.

In one embodiment, as note above, processor 12 is a 64-bit microprocessor which transfers data as longwords (i.e., four 16-bit words). Previous processor-cache interfaces implemented the processor-cache interface using a 64-bit bus for data and an additional bus for tag. The tag bus width has varied, but has nominally been 16-bit for a total of 80 bits. The problem with such an approach is that if the cache block (also called line) size is four times the data bus width, then no useful information appears on the tag bus for three out of every four bus cycles. As can be seen in FIG. 2, this is a waste of bus bandwidth which can adversely affect processor performance.

To more efficiently utilize the available bandwidth, one might include other information in the unused cycles. One such way of doing this is shown in FIG. 3a and is described in U.S. patent application Ser. No. 08/778,886, entitled VARIABLE BIT WIDTH CACHE MEMORY ARCHITECTURE, filed herewith by Pawlowski, the description of which is incorporated herein by reference. In FIG. 3a, words A–D are still transferred as in FIG. 2. In addition, other information such as error correcting code (ECC) words or status words are inserted in the unused tag word slots. Note that this style of operation still requires four bus cycles to transfer all necessary data. It does, however, allow for a larger tag and/or ECC than would otherwise be possible, once again improving the utilization of the 80 input/output lines. Performance is maximized if all tag information can be supplied in the first cycle and non-time critical following in subsequent cycles.

For 80-bit operation, to maximize performance, the tag limit is 16 bits. If more tag bits are needed, the 80-bits would be expanded within reason to accommodate the additional necessary bits. For example, if a 20-bit tag is essential, this would entail an 84-bit bus. 11 bits of ECC is sufficient regardless of tag size, within reason.

In an alternate embodiment even more bandwidth efficiency can be gained by increasing the width of data bus 20 by an additional word and then merging tag, ECC and data into an ordered block of information. On such embodiment is shown in FIG. 3b and is described in U.S. patent application Ser. No. 08/778,886, entitled VARIABLE BIT WIDTH CACHE MEMORY ARCHITECTURE, described above, the description of which is incorporated herein by reference. In such an embodiment, as is shown in FIG. 3b, the entire block of four operands, tag and ECC are transferred in 3 bus cycles 29.1–3. Tag and ECC data appear only during the first cycle (cycle 29.1), freeing those input/output lines for data transfer during cycles two and three. In the embodiment shown, tag and ECC can be partitioned among the available two words in any manner.

(It should be noted that ECC is not a necessary component but it is important to allow space for this to be implemented. The implementation would consist of a single data check of a full block (tag plus data A B C and D). This requires 11 bits of ECC for 256 bits of data plus up to 21 bits of tag/status information. The 21 bits is the limit imposed on the 96-bit device.)

Figure 4:
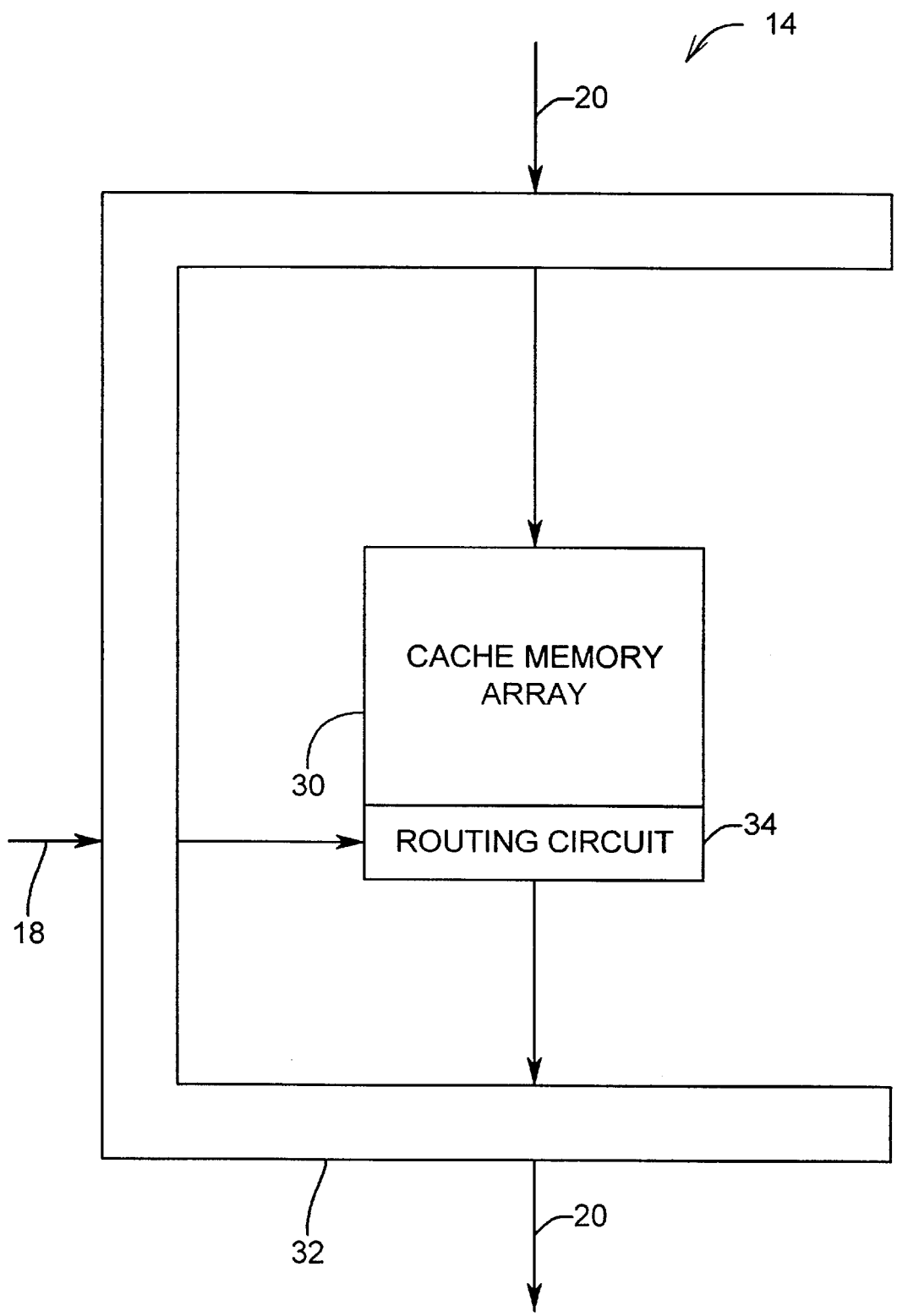
FIG. 4 illustrates a cache memory which can be used in the system of FIG. 1.

In one embodiment, as is shown in FIG. 4, cache memory 14 includes a memory array 30, a processor-cache interface 32 and a routing circuit 34. In FIG. 4, processor-cache interface 32 is connected to processor 12 over an M-word wide data bus 20. Routing circuit 34 takes the P+1 words of data and tag and transfers them in groups of M words to processor-cache interface 32. Processor-cache interface 32 in turn transfers the groups of M words to processor 12 over the M-word wide data bus 20. In one embodiment, cache memory 14 is configured as an N line cache, where each cache line includes a tag word and P words of data. That is, memory array 30 is an M line by P+1 word memory array. In one such embodiment, the P words of data also include one or more error correction code (ECC) words.

Figure 5:
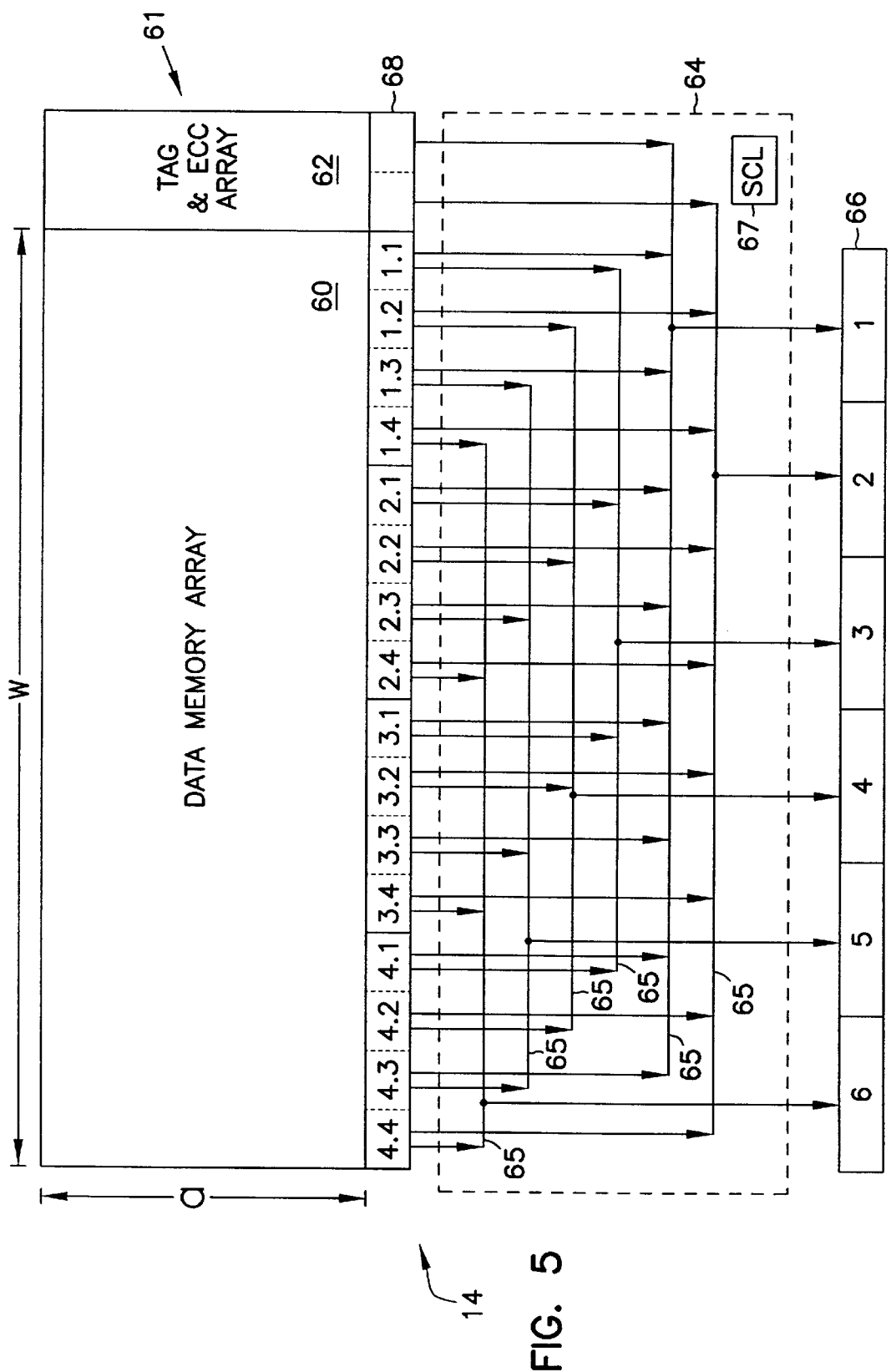
FIG. 5 is a block diagram representative of one embodiment of the cache memory of FIG. 4.

In one embodiment, the data ordering is designed to minimize the complexity of implementation and to allow one memory array design to operate as a 96 or 80-bit bus device. For instance, cache memory 14 may be implemented using an architecture which supports data transferred in the manner shown in FIGS. 3a and 3b. One such cache memory 14 is shown in FIG. 5. Cache memory 14 includes a cache memory array 61, a routing circuit 64 and a processor-cache interface 66. Cache memory array 61 includes a data memory array 60, a tag & ECC memory array 62 and a sense circuit 68. Data memory array 60 and a tag & ECC memory array 62 are connected through sense circuits 68 and routing circuit 64 to processor-cache interface 66. Routing circuit 64 includes selector circuits 65 and selection control logic 67. Selection control logic 67 controls the transfer of words from arrays 60 and 62 through selector circuits 65 to specific words within processor-client interface 66 according to the ordering shown in Table 1 above. In the embodiment shown, each line of the combined data memory array 60 and tag & ECC memory array 62 is a cache line in cache memory 14.

For 16-bit words, the architecture shown in FIG. 5 employs a data transfer methodology which permits higher useful data throughput on a 96-bit bus than what has been previously achieved with an 80-bit bus. To accomplish this, the architecture integrates data, tag, status and ECC. In the example shown in FIG. 3b, an entire block (which in this example is made up of a group of four longword data operands (longwords 1–4), tag, optionally status and/or ECC) is manipulated at one time with external routing at the appropriate width (via routing circuit 64).

The advantage of the architecture used for data memory 60, tag & ECC array 62 and sense circuit 68 in FIG. 5 is the provision to route memory array contents to/from processor-cache interface according to either an 80(+) or 96-bit data ordering concept. In FIG. 5, the pathways which must be available in routing circuit 64 in order to implement the six word wide operation are shown as arrows. At each cache memory transfer cycle, selection control logic 67 enables six of the 34 available pathways in order to provide the composite six word wide bus transaction. In one group of embodiments, where a 16-bit word is used, data memory array 60 is 256-bits wide and tag+ECC+status array 62 is 16 to 32-bits wide. If the tag+ECC+status array is 16-bits wide or less, then one less pathway is required (i.e., eliminates the pathway from the tag/ECC array to output word number 2 in the diagram). Using this architecture, sufficient bandwidth is present in the three 96-bit cycles to deliver as much data and tag information as is present in four cycles at 80-bits due to the compactness of data transactions.

Figure 6:
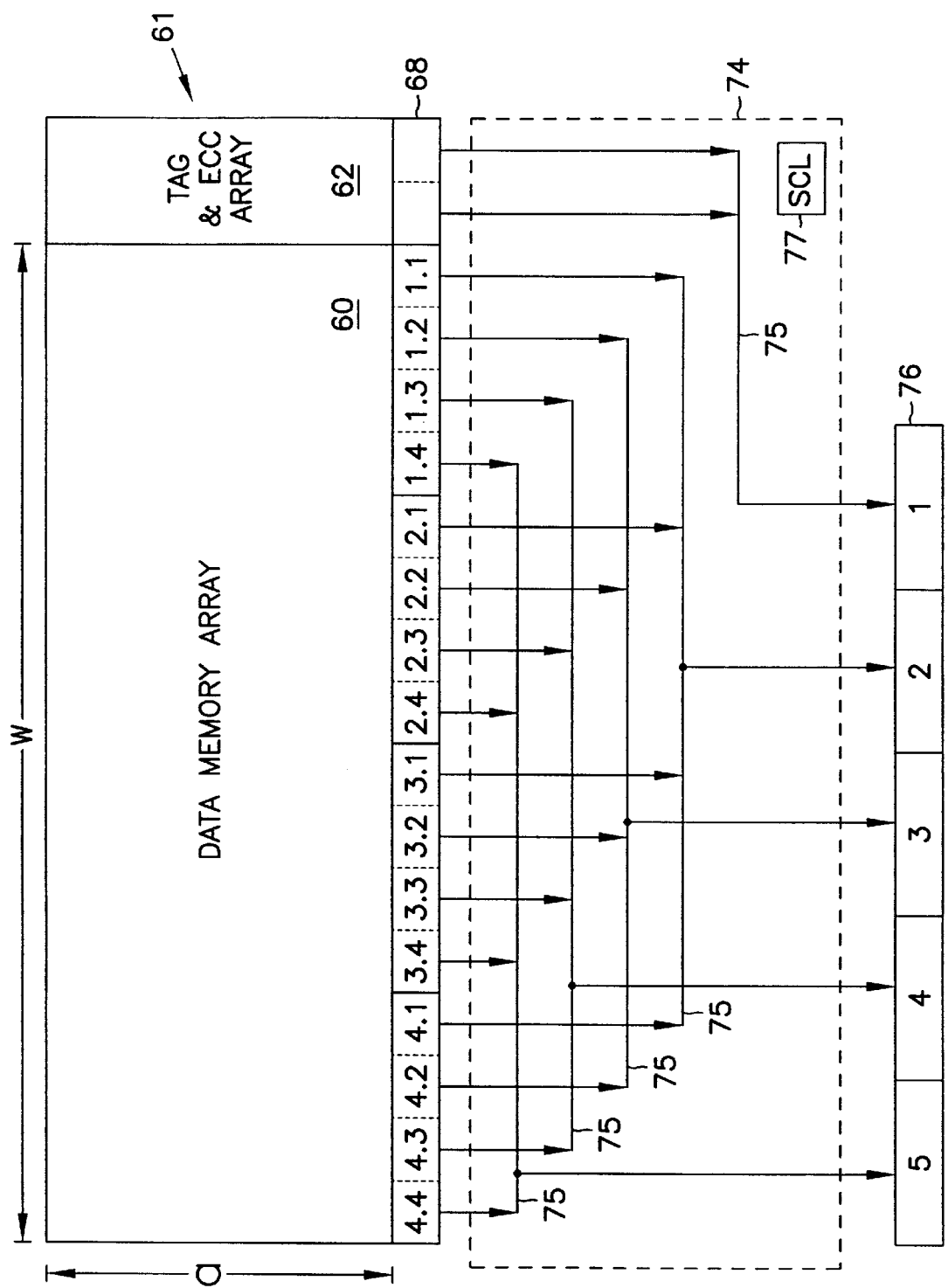
FIG. 6 is a block diagram representative of another embodiment of the cache memory of FIG. 4.

FIG. 6 illustrates the physical organization of a cache memory 14 with data routing implementing an 80(+)-bit device. As in FIG. 5 above, cache memory 14 includes a cache memory array 61. Cache memory array 61 includes a data memory array 60, a tag & ECC memory array 62 and a sense circuit 68. In addition, cache memory 14 of FIG. 6 includes a routing circuit 74 and a processor-cache interface 76. Data memory array 60 and a tag & ECC memory array 62 are connected through sense circuit 68 and routing circuit 74 to processor-cache interface 76. Routing circuit 74 includes selector circuits 75 and selection control logic 77. Selection control logic 77 controls the transfer of words from arrays 60 and 62 through selector circuits 65 to specific words within processor-client interface 76 according to the ordering shown in Table 1 above. As in the embodiment shown in FIG. 5, the architecture shown in FIG. 6 integrates data, tag, status and ECC. In the example shown an entire block (which in this example is made up of a group of four longword data operands (longwords 1–4), tag, optionally status and/or ECC) is manipulated at one time with external routing at the appropriate width (via routing circuit 74).

In the embodiment shown in FIG. 6, the pathways which must be available in routing circuit 74 in order to implement the five word wide operation are shown as arrows. At each cache memory transfer cycle, selection control logic 77 enables five of the 17–20 available pathways in order to provide the composite five word wide bus transaction. As in FIG. 5, in one group of embodiments, where a 16-bit word is used, data memory array 60 is 256-bits wide and tag+ECC+status array 62 is 16 to 32-bits wide. If tag+ECC+status array 62 is 16-bits wide or less, then one less pathway is required (i.e. only 17 pathways are needed). On the other hand, tag+ECC+status array 62 can be up to four words wide and all necessary transfers can still be accomplished in only four transfer cycles. (In one such embodiment, tag+ECC+status array 62 could be 64-bits wide maximum with an 80-bit bus resulting in the 20 necessary pathways, all feeding into output block number 1.) Since ECC and status information may transact on bits once restricted to tag use only, this architecture is superior to previous implementations in its ability to make more use of the bits normally defined as tag only.

It can be readily seen from examining FIGS. 5 and 6 that routing circuit 74 and processor-cache interface 76 of FIG. 6 are basically a subset of routing circuit 64 and processor-cache interface 66, respectively, of FIG. 5 (blocks one and two of FIG. 5 are merged into block one of FIG. 6). Therefore, the same cache memory 14 architecture can function as either a six word wide (e.g., 96-bit) or five word wide (e.g., 80(+)-bit) device with the necessary selection logic modifications.

Although the present invention has been described with reference to selected embodiments, those skilled in the art will recognize that changes may be made in form and detail without departing from the spirit and scope of the invention. In particular, the width of the data, tag or ECC words could be increased or decreased, as could the width of the bus serving as the processor-cache interface.

What is claimed is:

1. In a computer system having a processor and a cache memory, wherein the processor is connected to the cache memory by an address bus and wherein the cache memory includes a plurality of cache line data words, a method of transferring, from the cache memory to the processor, a single cache line from the plurality of cache lines, the method comprising the steps of:

reading an address from the address bus;
selecting a cache line corresponding to the address;
determining an order for transferring cache line data words from the selected cache line, wherein the step of determining an order includes the steps of determining the likelihood that each data word in the cache line will be needed by the processor and determining an optimal set of data words to be transferred during a first cache transfer cycle; and transferring, from the cache memory to the processor, the plurality of cache line data words in the determined order.

2. The method according to claim 1, wherein the order for transferring is from most likely to be needed to least likely to be needed.

3. The method according to claim 1, wherein the step determining an order includes the step of determining an optimal set of data words to be transferred during a second cache transfer cycle.

4. A cache memory, comprising:

a cache memory array having a plurality of cache lines, wherein each cache line includes a tag word and a plurality of data words;

a processor-cache interface; and a routing circuit connected to the memory array and the processor-cache interface, wherein the routing circuit includes a plurality of selector circuits and selection control logic connected to the plurality of selected circuits, wherein the selection control logic controls the transfer of cache line data words from the cache memory array through the plurality of selector circuits to the processor-cache interface, wherein the cache line data words are transferred in order over a plurality of cache transfer cycles, according to the likelihood that the transferred data words will be needed, wherein an optimal set of data words is transferred during the first cache transfer cycle.

5. A cache memory, comprising:

a cache memory array having a plurality of cache lines, wherein each cache line includes a tag word and N data words;

a processor-cache interface, wherein the processor-cache interface includes an M-word wide bus, where M is less than N; and a routing circuit connected to the memory array and the processor-cache interface, wherein the routing circuit includes a plurality of selector circuits and selection control logic connected to the plurality of selector circuits, wherein the selection control logic controls the transfer of groups of M cache line data words from the cache memory array through the plurality of selector circuits to the processor-cache interface, wherein the groups of M cache line data words are transferred in order according to the likelihood that the transferred data words will be needed, wherein the groups of M cache line data words include a first group of cache line data words, wherein the first group of cache line data word is transferred before all other groups of cache line data words and wherein the first group of cache line data words includes the words most likely to be needed by a processor.

6. The cache memory according to claim 5, wherein the order for transferring is from most likely to be needed to least likely to be needed.

7. The cache memory according to claim 5, wherein M is four and N is sixteen and wherein the first group of cache line data words includes four of the most likely words to be needed by a processor.

8. A computer system, comprising:

a processor having an address bus and an M-word wide data bus, wherein M is greater than two;

a memory connected to the processor by the address bus and the data bus; and a cache memory, wherein the cache memory includes:
a cache memory array having a plurality of cache lines, wherein each cache line includes a tag word and N data words, wherein N is greater than M;

a processor-cache interface connected to the processor and the memory by the address bus and the data bus; and a routing circuit connected to the memory array and the processor-cache interface, wherein the routing circuit includes a plurality of selector circuits and selection control logic connected to the plurality of selector circuits, wherein the selection control logic controls the transfer of groups of M cache line data words from the cache memory array through the plurality of selector circuits to the processor-cache interface, wherein the groups of M cache line data words are transferred in order according to the likelihood that the transferred data words will be needed, wherein the groups of M cache line data words include a first group of cache line data words, wherein the first group of cache line data word is transferred before all other groups of cache line data words and wherein the first group of cache line data words includes the words most likely to be needed by the processor.

9. The computer system according to claim 8, wherein the order for transferring is from most likely to be needed to least likely to be needed.

10. The cache memory according to claim 8, wherein M is four and N is sixteen and wherein the first group of cache line data words includes four of the most likely words to be needed by a processor.

* * * * *